US012722829B2

(12) United States Patent
Brandt Sanz et al.

(10) Patent No.: US 12,722,829 B2
(45) Date of Patent: Sep. 1, 2026

(54) PROCESS FOR MAKING A WATER-SOLUBLE DETERGENT POUCH

(71) Applicant: The Procter & Gamble Company, Cincinnati, OH (US)

(72) Inventors: Miguel Brandt Sanz, Etterbeek (BE); Chiara Iannone, Parma (IT); Sophie Schittecat, Heffen (BE)

(73) Assignee: The Procter & Gamble Company, Cincinnati, OH (US)

( * ) Notice: Subject to any disclaimer, the term of this patent is extended or adjusted under 35 U.S.C. 154(b) by 0 days.

(21) Appl. No.: 19/086,190

(22) Filed: Mar. 21, 2025

(65) Prior Publication Data

US 2025/0320013 A1 Oct. 16, 2025

(30) Foreign Application Priority Data

Apr. 16, 2024 (EP) .................................... 24170566

(51) Int. Cl.

| | |
|---|---|
| ***B65B 47/02*** | (2006.01) |
| ***B65B 3/02*** | (2006.01) |
| ***B65B 3/04*** | (2006.01) |
| ***B65B 9/04*** | (2006.01) |
| ***B65B 11/50*** | (2006.01) |
| ***B65B 55/24*** | (2006.01) |
| ***C11D 17/04*** | (2006.01) |

(52) U.S. Cl.

CPC ................ *B65B 47/02* (2013.01); *B65B 3/04* (2013.01); *B65B 9/042* (2013.01); *B65B 11/50* (2013.01); *B65B 55/24* (2013.01); *C11D 17/044* (2013.01)

(58) Field of Classification Search

CPC .. B65B 3/04; B65B 9/04; B65B 9/042; B65B 55/24; B65B 47/10; B29C 2791/006; B29C 51/428; B29C 51/225; B08B 5/046; B08B 5/04

USPC .......................................................... 15/300.1

See application file for complete search history.

(56) References Cited

U.S. PATENT DOCUMENTS

| | | | | |
|---|---|---|---|---|
| 3,218,776 | A * | 11/1965 | Cloud | B65B 47/10 53/546 |
| 3,239,863 | A * | 3/1966 | Gardner | A47L 5/14 15/345 |
| 10,273,027 | B2 * | 4/2019 | Kepinski | B65B 55/24 |
| 2002/0137648 | A1 | 9/2002 | Sharma et al. | |
| 2002/0142930 | A1 | 10/2002 | Smith et al. | |

(Continued)

OTHER PUBLICATIONS

EPO Search Report and Opinion for 24170566.4 dated Sep. 27, 2024, 12 pages.

*Primary Examiner* — Andrew M Tecco
*Assistant Examiner* — Nicholas E Igbokwe
(74) *Attorney, Agent, or Firm* — Elizabeth A. Conklin

(57) ABSTRACT

A process for making a water-soluble detergent pouch containing a solid component is provided, where the process employs a scraper and a vacuum. The process includes deforming a first water-soluble film into a cavity and over a surrounding edge to form an open recess and a film-covered surrounding edge, filling the open recess with a solid component, passing a scraper over the top of the filled recess to remove some of the solid component, applying a vacuum to remove some of the solid component, and positioning a second water-soluble film to close the filled recess by sealing the second water-soluble film to the first water-soluble film.

15 Claims, 4 Drawing Sheets

(56) References Cited

U.S. PATENT DOCUMENTS

| | | | |
|---|---|---|---|
| 2002/0169092 | A1 | 11/2002 | Alexandre et al. |
| 2003/0077005 | A1 | 4/2003 | Fisher et al. |
| 2003/0114333 | A1 | 6/2003 | Somerville-roberts et al. |
| 2003/0136088 | A1 * | 7/2003 | Wilhelm ................. B65B 7/164 53/167 |
| 2004/0144064 | A1 | 7/2004 | Viltro |
| 2004/0235697 | A1 | 11/2004 | Smith et al. |
| 2005/0034432 | A1 | 2/2005 | Kroese et al. |
| 2005/0049164 | A1 | 3/2005 | Sommerville-roberts et al. |
| 2005/0061703 | A1 | 3/2005 | Catlin et al. |
| 2005/0065051 | A1 | 3/2005 | Catlin et al. |
| 2006/0094622 | A1 | 5/2006 | Fisher et al. |
| 2006/0097424 | A1 | 5/2006 | Sharma et al. |
| 2007/0004612 | A1 | 1/2007 | Catlin et al. |
| 2008/0041020 | A1 | 2/2008 | Alexandre et al. |
| 2008/0076693 | A1 | 3/2008 | Sharma et al. |
| 2008/0209863 | A1 | 9/2008 | Catlin |
| 2009/0199877 | A1 | 8/2009 | Koch et al. |
| 2010/0081598 | A1 | 4/2010 | Sharma et al. |
| 2011/0265829 | A1 | 11/2011 | Catlin et al. |
| 2011/0266169 | A1 | 11/2011 | Catlin et al. |
| 2011/0266185 | A1 | 11/2011 | Catlin et al. |
| 2012/0139139 | A1 | 6/2012 | Catlin et al. |
| 2012/0159718 | A1 | 6/2012 | Catlin |
| 2012/0159904 | A1 | 6/2012 | Catlin et al. |
| 2012/0294969 | A1 | 11/2012 | Koch et al. |
| 2013/0240388 | A1 | 9/2013 | Boysen et al. |
| 2014/0179584 | A1 | 6/2014 | Catlin et al. |
| 2014/0345064 | A1 | 11/2014 | Koch et al. |
| 2015/0119311 | A1 | 4/2015 | Catlin et al. |
| 2016/0251148 | A1 | 9/2016 | Edwards |
| 2016/0257914 | A1 | 9/2016 | Catlin et al. |
| 2016/0340068 | A1 * | 11/2016 | Brandt Sanz ........ C11D 17/042 |
| 2017/0101203 | A1 * | 4/2017 | Waterman ............... B65B 9/042 |
| 2017/0368580 | A1 * | 12/2017 | Brandt Sanz ........... B65B 47/02 |
| 2018/0127200 | A1 * | 5/2018 | Edwards ................. B65B 3/022 |
| 2018/0362905 | A1 | 12/2018 | Catlin et al. |
| 2021/0276053 | A1 * | 9/2021 | Bosio ...................... B08B 5/026 |
| 2023/0339663 | A1 * | 10/2023 | Brandt Sanz ........... B65B 9/042 |

* cited by examiner

PROCESS FOR MAKING A WATER-SOLUBLE DETERGENT POUCH

FIELD OF THE INVENTION

The present invention relates to a process for making a water-soluble detergent pouch comprising a solid component. The process employs a scraper and a vacuum.

BACKGROUND OF THE INVENTION

Unit dose detergent articles are particularly popular with consumers. The case of use and consistent performance are two characteristics that consumers find desirable. For automatic dishwashing and laundry applications, unit dose detergent articles in water-soluble pouch form are very popular with consumers.

Water-soluble automatic dishwashing or laundry detergent pouches comprise an automatic dishwashing or laundry detergent composition that is enclosed by a water-soluble film. During the washing cycle, the detergent chemistry is released into the washing zone of the automatic dishwashing or laundry appliance and helps treat the dishware or laundry to be cleaned.

Water-soluble detergent pouches can comprise a detergent composition having a solid component. Typically, the solid component provides good cleaning performance, for example bleach such as percarbonate bleach, can be incorporated into the solid component of the detergent composition.

However, dosing solid component into the water-soluble detergent pouch can be difficult. Typically, a water-soluble film is deformed into a cavity, and the solid component is dosed into this cavity, and is then subsequently sealed by additional water-soluble film to form the water-soluble detergent pouch. The sealing is typically performed around the cavity, on the surrounding edge. During the dosing step, solid component can enter this surrounding edge region, which can cause weak seals that can lead to product leakage or even product failure. Process manufacturers often employ a vacuum means to remove solid component that has entered this surround edge region. However, this vacuum means often needs to be operated at a significantly high pressure and air velocity to ensure adequate removal of solid component. This in turn can lead to solid component being removed from the cavity, which can lead to under fill levels in the pouch. To avoid underfill, detergent manufacturers often configure their process to overfill the cavity.

The present invention addresses the need to improve the dosing system of a solid component to a water-soluble detergent pouch. The present invention provides a process that removes solid component from the surrounding edge region, allows good sealing of the water-soluble film, and reduces the unwanted removal of solid component from the cavity which can lead to this undesirable under fill level.

SUMMARY OF THE INVENTION

The present invention provides, in an example, a process for making a water-soluble detergent pouch, wherein the process comprises the steps of:

(a) placing a first water-soluble film over a mold having a cavity and a surrounding edge;

(b) deforming the first water-soluble film into the cavity and over the surrounding edge to form an open recess and a film-covered surrounding edge;

(c) filling the open recess with a solid component of a detergent composition to form a filled recess, wherein some of the solid component also spills onto the film-covered surrounding edge;

(d) passing a scraper over the top of the filled recess and film-covered surrounding edge without contacting the scraper with the first water-soluble film to remove some of the solid component from the film-covered surrounding edge to form a scraped film-covered surrounding edge;

(e) applying a vacuum to the scraped film-covered surrounding edge to remove some of the solid component from the scraped film-covered surrounding edge to form a vacuumed film-covered surrounding edge;

(f) positioning a second water-soluble film over the filled recess and vacuumed film-covered surround edge, and closing the filled recess by sealing the second water-soluble film to the first water-soluble film present in the vacuumed film-covered surrounding edge, to form the water-soluble detergent pouch, wherein the water-soluble detergent pouch comprises a detergent composition having a solid component that is enclosed by a water-soluble film.

DETAILED DESCRIPTION OF THE INVENTION

Figure 1:
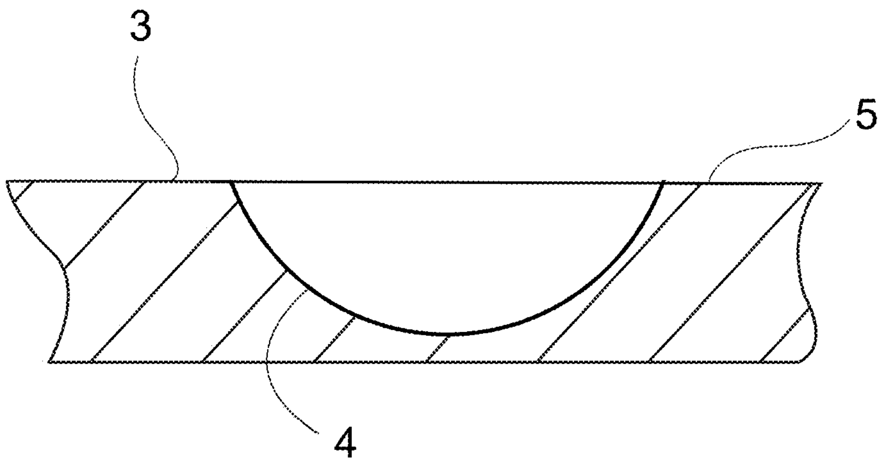
FIG. 1 shows a mold having a cavity.
Figure 2:
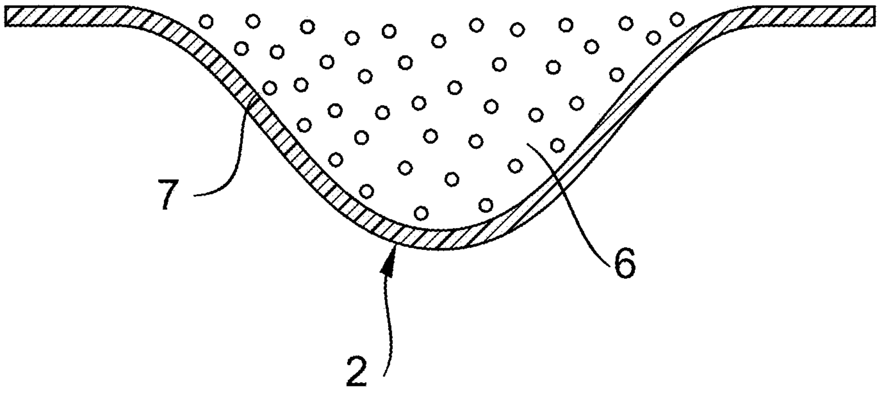
FIG. 2 shows a water-soluble film having a recess filled with a solid component of a detergent composition.
Figure 3:
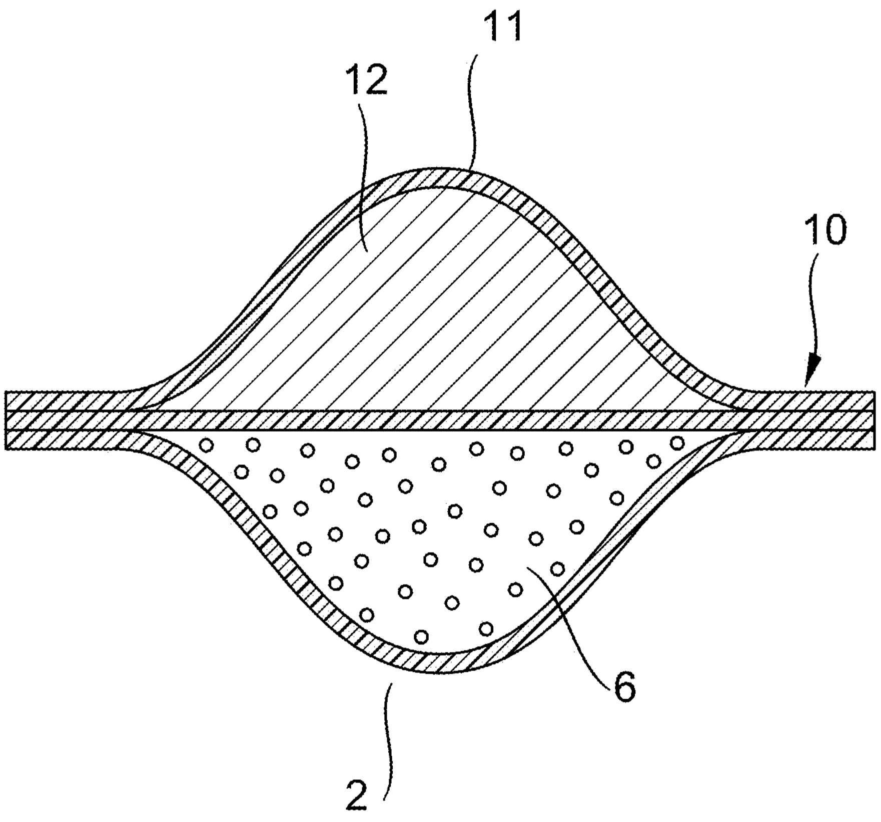
FIG. 3 shows the first water-soluble film of FIG. 2 sealed to a second water-soluble film, where second water-soluble film has a pre-formed compartment containing a component of a detergent composition.
Figure 4:
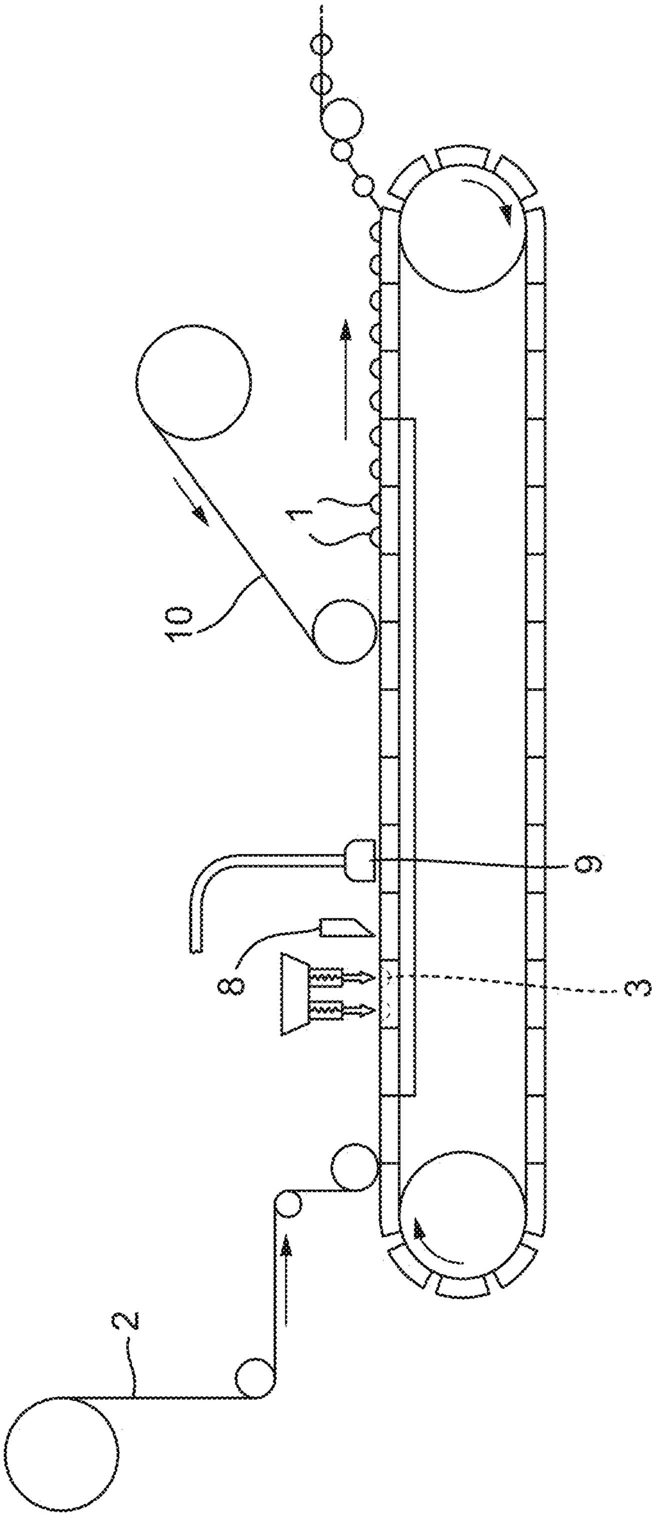
FIG. 4 shows the process for making the water-soluble detergent pouch. A water-soluble film is placed over a mold and deformed into the cavity to form an open recess. The open recess is filled with a solid component to form a filled recess. A scraper is passed over the top of the filled recess in a non-contact manner, and a vacuum is then applied. A second water-soluble film is positioned over the filled recess, which is then sealed to form the water-soluble detergent pouch.
Figure 5:
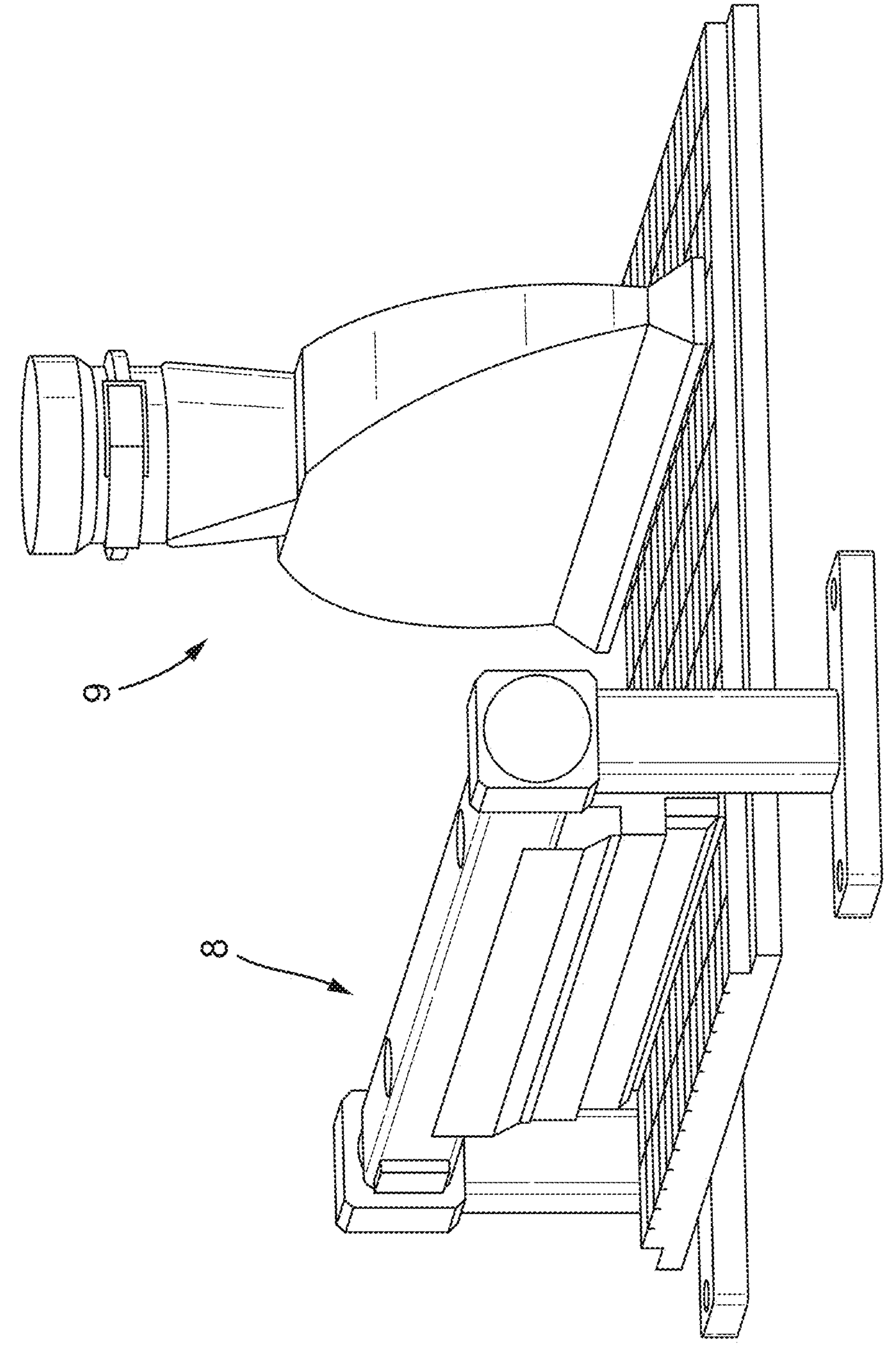
FIG. 5 shows a process for making a water-soluble pouch, with the scraper and vacuum shown extending over multiple rows.

Process for Making a Water-Soluble Detergent Pouch

The process for making a water-soluble detergent pouch (1) comprises the steps of:

(a) placing a first water-soluble film (2) over a mold (3) having a cavity (4) and a surrounding edge (5);

(b) deforming the first water-soluble film (2) into the cavity (4) and over the surrounding edge to form an open recess and a film-covered surrounding edge;

(c) filling the open recess with a solid component (6) of a detergent composition to form a filled recess (7), wherein some of the solid component also spills onto the film-covered surrounding edge;

(d) passing a scraper (8) over the top of the filled recess and film-covered surrounding edge without contacting the scraper (8) with the first water-soluble film to remove some of the solid component from the film-covered surrounding edge to form a scraped film-covered surrounding edge;

(e) applying a vacuum (9) to the scraped film-covered surrounding edge to remove some of the solid component from the scraped film-covered surrounding edge to form a vacuumed film-covered surrounding edge;

(f) positioning a second water-soluble film (10) over the filled recess and vacuumed film-covered surround edge, and closing the filled recess by sealing the second water-soluble film (10) to the first water-soluble film (2) present in the vacuumed film-covered surrounding edge, to form the water-soluble detergent pouch (1), wherein the water-soluble detergent pouch (1) comprises a detergent composition having a solid component (6) that is enclosed by a water-soluble film.

Preferably, the water-soluble film is a polyvinyl alcohol film.

Preferably, the second water-soluble film (10) comprises one or more pre-formed compartments (11). Typically, the one or more of the pre-formed compartments (11) contain a liquid component (12) of the detergent composition.

Preferably, the process is a continuous process, wherein the molds are placed on a moving conveyor that passes underneath the scraper during step (d), and underneath the vacuum means during step (e).

Preferably the continuous process comprises a multitude of cavities arranged over multiple rows and multiple lanes arranged over the X-machine direction and the machine direction respectively, wherein at least part of the surrounding edges separate the individual cavities from each other.

Preferably, one scraper is positioned across multiple rows.

Preferably, one vacuum is positioned across multiple rows.

Step (a). Step (a) places a first water-soluble film over a mold having a cavity and a surrounding edge.

Step (a) can involve feeding a first water-soluble film, typically, from an unwinding roll, over a mold, typically a plurality of molds by a conveyor system. Preferably, the film is tensioned and kept in place on the conveyor, preferably under influence of an underlying vacuum. The first water-soluble film can pass through a printing unit prior to placement over the mold or plurality of molds. The printing unit can print information, such as branding information or usage information onto the first water-soluble film. The printing can be on the inside or the outside of the first water-soluble film, preferably on the inside of the water-soluble film. The printed information at this stage of the process may be a distorted image. The printing unit can comprise multiple printing units for example to provide multiple print colours. The printing unit can comprise a flexographic printing unit, an inkjet printing unit, or a combination thereof, preferably a combination of flexographic printing units.

Step (b). Step (b) deforms the first water-soluble film into the cavity and over the surrounding edge to form an open recess and a film-covered surrounding edge.

The first water-soluble film can be deformed into the cavity by any suitable means. Suitable means include vacuum and/or thermal means. Typically, by thermoforming means. During step (b), the first water-soluble film can be deformed into the cavity by a vacuum system. This could be a single step vacuum system, or a multi-step vacuum system in which the vacuum is sequentially gradually built on the film.

Alternatively, or in addition, preferably in addition, heat can be applied to the first water-soluble film. The first water-soluble film can pass through a heating system, such as an infra-red lamp. The first water-soluble film can pass underneath an infra-red lamp. The infra-red lamp can have a temperature of from 300° C. to 500° C., with the temperature of the first water-soluble film typically being controlled by the temperature of the infra-red lamp. The first water-soluble film is typically heated to a temperature of from 70° C. to 140° C. The heating step again could be a single heating step in which the film is exposed to a heating system set at a single temperature, or could be a multi-step system in which a multitude of heaters are positioned sequentially to gradually heat up the water-soluble film. Upon deformation, the distorted printed image ex step (a) can be straightened to the targeted printed image.

The first water-soluble film can also be brought into contact with a contact heating device. The contact heating device can be cylindrical (e.g., a roller) or planar, preferably cylindrical. This can happen in step (b) or preferably before step (b). When using such a contact heating system, the heat transfer takes place at least partly by direct contact between a surface of the heating device and the water-soluble film. Such a contact heating system can result in a homogeneous or a heterogeneous temperature distribution of its surface; the latter can be achieved in that the surface of the heating device has mutually adjacent heated surface regions which are in contact with film sections, which are subsequently deformed. Preferably, the film is uniformly heated. Typically, the heated surface regions are each heated via at least one separately controllable heating element and the controllable heating elements of at least two adjacent heated surface regions have a temperature difference of between 10 and 60° C. The heterogeneous temperature profile resulting from this temperature difference may make it possible to produce receiving containers with demanding geometries with simultaneous homogeneous film thickness distribution. In addition to the relative temperature differences between adjacent heating elements, the results of the heating are also influenced by their absolute temperature. Process variants in which the controllable heating elements of the heated surface regions of the heating device have a temperature in the range of from 50 to 150° C., preferably from 80 to 135° C., may be advantageous. The water-soluble film after having been brought into contact with the heating device preferably has a temperature in the range of from 50 to 150° C., preferably from 80 to 135° C. Particularly preferred materials for producing the surface with which the water-soluble film is in contact in step b) are ceramic or metal, in particular steel. In a preferred process variant, the first water-soluble film is brought into contact with the heating device only on one side, preferably the upper side of the water-soluble film. The water-soluble film is preferably heated for a period of from 0.3 to 7.0 seconds, preferably from 0.3. to 3.0 seconds and more preferably from 0.3 to 1.0 second. The water-soluble film can be brought in contact with the contact heating device under influence of an under-pressure.

Step (c). Step (c) fills the open recess with a solid component of a detergent composition to form a filled recess, wherein some of the solid component also spills onto the film-covered surrounding edge.

Step (c) typically uses a dispenser system to dispense solid component into the open recess. One suitable volumetric dispenser system includes a powder dosing hopper system, typically followed by an auger dosing/metering system. The first film may be pin-pricked mechanically or through use of a laser prior or post the solid component dispension in order to facilitate air removal from the enclosing compartment.

Step (d). Step (d) passes a scraper over the top of the filled recess and film-covered surrounding edge without contacting the scraper with the first water-soluble film to remove some of the solid component from the film-covered surrounding edge to form a scraped film-covered surrounding edge.

Preferably, during step (d) the distance between the scraper and the water-soluble film is from 0.2 mm to 1.0 mm. Having a small distance between scraper and film avoids the scraper damaging the film.

Preferably, during step (d) the angle of the scraper to the plane of the top of the film-covered surrounding edge is from 80° to 100°.

Preferably, during step (d), the angle of the scraper to the machine direction is from 60° to 120°, or more typically about 90°. The scraper can be perpendicular to the machine direction.

Preferably, the scraper used in step (d) is a rigid blade having a chamfered tip. Such a chamfered tip is thought to reduce the risk of powder particles sticking between the distanced scraper tip and the first water-soluble film, causing film damage accordingly. Similarly, the scraper may comprise a vertical spring system to further reduce this blockage risk. A rigid blade is also less sensitive to degradation over time, requiring less exchange of parts accordingly.

The conveyer may comprise multiple lanes oriented parallel to each other in machine direction. These multiple lanes maybe simultaneously scraped by a single scraper, or a combination of scrapers may be provided to scrape the multiple lanes. Preferably a single scraper is positioned across the multiple lanes.

The main purpose of the scraper is to remove larger sized particles form the film-covered surrounding edges.

Step (e). Step (e) applies a vacuum to the scraped film-covered surrounding edge to remove some of the solid component from the scraped film-covered surrounding edge to form a vacuumed film-covered surrounding edge.

Preferably, during step (e), the vacuum is applied by means that comprises a nozzle and wherein the average air velocity at the nozzle tip is from 5.0 m/s to 9.0 m/s.

Preferably, during step (e) the vacuum is applied by means that comprises a nozzle having a cross section of from 0.03 $m^2$ to 0.04 $m^2$, and wherein the air flow through the nozzle is from 750 $m^3$/hr to 900 $m^3$/hr.

Considering larger particles already being removed by the preceding scraper system, a lower degree of vacuum is thought required compared to a system lacking the preceding scraper. This lower degree of vacuum also yields less particles to be removed from the filled recess, better controlling under fill risk accordingly.

The conveyer may comprise multiple lanes oriented parallel to each other in machine direction. These multiple lanes maybe simultaneously vacuumed by a single vacuum nozzle, or a combination of vacuum nozzles may be provided to vacuum the multiple lanes. Preferably a single vacuum nozzle is positioned across the multiple lanes.

Contrary to a static vacuum nozzle, a rotary vacuum drum with matching cavity design, enabling application of vacuum to surrounding edges only and as such further reducing particle removal risk from filled cavities, may equally be applied.

Step (f). Step (f) positions a second water-soluble film over the filled recess and vacuumed film-covered surround edge, and closes the filled recess by sealing the second water-soluble film to the first water-soluble film present in the vacuumed film-covered surrounding edge, to form the water-soluble detergent pouch.

The second film may be a single film applied under tension from an unwinding roll, generating a single or side-by side multi-compartment unit dose article. Preferably, the second water-soluble film comprises one or more pre-formed compartments, more preferably, wherein the one or more of the pre-formed compartments contain a liquid component of the detergent composition, generation a multi-compartment pouch in generally superposed relationship accordingly. Preferably these pre-formed compartments are formed on a rotary drum, positioned directly above the making unit described in steps (a) to (c).

Preferably, the overall process described is a continuous process, wherein the molds are placed on a moving conveyor, preferably a horizontal conveyor that passes underneath the scraper during step (d), and underneath the vacuum means during step (c).

Any suitable sealing means can be used, such as heat sealing, solvent sealing, or any combination thereof. Preferably the sealing means includes solvent sealing, more preferably wherein the solvent preferably substantially consists of water. Preferably the sealing solution is applied to the bottom of the second film. Suitable means to apply the sealing solution include contact, f.e. through use of a felt roll, and non-contact, e.g., through use of a spraying system.

A cutting operation can also be performed, especially if a plurality of molds has been used and several filled recesses are sealed to form a web of filled recesses connected by water-soluble film. The cutting operation can cut this web to form individual water-soluble detergent pouches. The cutting device may comprise a rotary blade cutting the water-soluble film web in machine direction. The cutting device may equally comprise a rotary knife with distanced knife blades positioned thereon, cutting the water-soluble film web in the cross-machine direction. The rotary cutting knife roll may rotate at variable speed, e.g., matching the speed of the film web at the point of cutting while accelerating in between two cutting steps.

The individual detergent pouches may optionally be dusted prior to packing in tubs or bags. The tubs or bags may be made from a plastic and/or a paper based material. The packaging may comprise a locking system, preferably a child safe closure system.

Water-Soluble Detergent Pouch

The pouch comprises a detergent composition having a solid component that is enclosed by a water-soluble film.

The water-soluble detergent pouch can be a water-soluble laundry detergent pouch, and wherein the detergent composition is a laundry detergent composition.

The water-soluble detergent pouch can be a water-soluble automatic dishwashing detergent pouch, and wherein the detergent composition is an automatic dishwashing detergent composition.

Preferably, the pouch comprises an automatic dishwashing detergent composition that is enclosed by a water-soluble film.

The pouch can be a single compartment pouch comprising only one compartment. Typically for this embodiment, the detergent composition is contained within this single compartment.

The pouch may also be a multi-compartment pouch, comprising more than one compartment. Typically, these separate compartments are separated by water-soluble film.

The multi-compartment pouch may have a side-by-side configuration. In this manner, the separate compartments are typically sealed together so that at least one compartment is side by side to another compartment. The side-by-side configuration may be foldable between adjacent compartments to facilitate placement of the multi-compartment pouch into a dishwashing or laundry detergent receptacle.

The multi-compartment pouch may have a superposed configuration. In this manner, the separate compartments are typically sealed together so that at least one compartment is superposed on top of another compartment.

Multi-compartment pouches can be preferred when the automatic dishwashing or laundry detergent composition comprises both a solid component and a liquid component. The multi-compartment pouch can comprise the liquid component in one or more separate compartments to the solid component. However, multi-compartment pouches can also be suitable when the automatic dishwashing or laundry detergent composition comprises only a solid component, or a solid component and a liquid component.

Single compartment pouches can be preferred when the automatic dishwashing detergent or laundry composition comprises only a solid component, or a solid component and a liquid component. However, single compartment pouches can also be suitable when the automatic dishwashing or laundry detergent composition comprises both a solid component and a liquid component, for example, the solid component may be a discontinuous phase that is dispersed within the liquid component that is a continuous phase, or the liquid component is in the form of a gel and is in direct contact with, such as layered onto, the powder component.

The multi-compartment pouch may comprise two or more compartments, or three or more compartments, or four or more compartments, or five or more compartments, or even six or more compartments, and preferably from 2 to 10 compartments, or from 3 to 9 compartments, or from 4 to 8 compartments, or even from 5 to 7 compartments.

It may be preferred for the compartments comprising the liquid component to be in a side-by-side configuration.

It may be preferred for the compartment(s) comprising the liquid component to be superposed on top of the compartment(s) comprising the solid component.

It may be preferred for the compartment(s) comprising the liquid component to be positioned in a side-by-side configuration with the compartment(s) comprising the solid component.

It may be preferred for the solid component to be contained within only one single compartment within the pouch.

It may be preferred for the liquid component to be contained within two or more compartments within the pouch, or even three or more compartments, or four or more compartments, or five or more compartments, or even six or more compartments, and preferably from 2 to 10 compartments, or from 3 to 9 compartments, or from 4 to 8 compartments, or even from 5 to 7 compartments.

It may be preferred for the solid component to be contained within only one single compartment within the pouch, and it may be preferred for the liquid component to be contained within two or more compartments within the pouch, or even three or more compartments, or four or more compartments, or five or more compartments, or even six or more compartments, and preferably from 2 to 10 compartments, or from 3 to 9 compartments, or from 4 to 8 compartments, or even from 5 to 7 compartments.

It may be preferred for the compartment(s) that contain the liquid component to be super-posed on top of the compartment(s) that contain the solid component. If the liquid component is contained within more than one compartment, it may be preferred for these compartments to be in a side-by-side configuration. If the solid component is contained within more than one compartment, it may be preferred for these compartments to be in a side-by-side configuration Typically, the pouch has the following dimensions:

(i) a maximum length of from 30 mm to 90 mm;
(ii) a maximum width of from 30 mm to 54 mm;
(iii) a maximum height of from 8 mm to 41 mm; and
(iv) a maximum internal compartment volume of from 10 ml to 199 ml.

Typically, the weight of the pouch is in the range of from 10 g to 50 g, preferably from 11 g to 26 g, or from 12 g to 24 g, or even from 13 g to 20 g.

Typically, the pouch comprises from 9.0 g to 29.7 g, or from 10.0 g to 25.7 g, or from 11.0 g to 23.7 g, or from 12.0 g to 19.7 g of the automatic dishwashing or laundry detergent composition.

The automatic dishwashing or laundry detergent composition can be made up of from 0.5 g to 10 g, or from 0.6 g to 9.0 g, or from 0.7 g to 8 0 g, or from 0.8 g to 7.0 g, or from 0.9 g to 6.0 g, or from 0.9 g to 5.0 g, or from 1.0 g to 4.0 g liquid component.

The automatic dishwashing or laundry detergent composition can be made up of from 4.0 g to 28 g, or from 5.0 g to 26 g, or from 6.0 g to 24 g, or from 7.0 g to 22 g, or from 8.0 g to 20 g, or from 10 g to 18 g, or from 13 g to 16 g solid component.

Typically, the pouch comprises from 0.3 g to 1.0 g, or from 0.35 g to 0.9 g, or from 0.4 g to 0.8 g, or from 0.5 g to 0.7 g water-soluble film.

Water-Soluble Film

The water-soluble film preferably has a thickness of from 20 to 150 microns, preferably from 35 to 125 microns, or even more preferably from 50 to 110 microns, most preferably about 76 microns.

The water-soluble film is typically soluble or dispersible in water. Preferably, the film has a water-solubility of at least 50%, preferably at least 75% or even at least 95%, as measured by the method set out here after using a glass-filter with a maximum pore size of 20 microns: 5 grams±0.1 gram of film material is added in a pre-weighed 3L beaker and 2L±5 ml of distilled water is added. This is stirred vigorously on a magnetic stirrer, Labline model No. 1250 or equivalent and 5 cm magnetic stirrer, set at 600 rpm, for 30 minutes at 30° C. Then, the mixture is filtered through a folded qualitative sintered-glass filter with a pore size as defined above (max. 20 micron). The water is dried off from the collected filtrate by any conventional method, and the weight of the remaining material is determined (which is the dissolved or dispersed fraction). Then, the percentage solubility (or dispersibility) can be calculated.

The water-soluble film material may be obtained by casting, blow-molding, extrusion or blown extrusion of the polymeric material, as known in the art.

The water-soluble film preferably comprises polyvinylalcohol (PVA). The polyvinylalcohol may be present between 50% and 95%, preferably between 55% and 90%, more preferably between 60% and 80% by weight of the water-soluble film. The polyvinylalcohol preferably comprises polyvinyl alcohol homopolymer, polyvinylalcohol copolymer, or a mixture thereof. Preferably, the water-soluble film comprises a blend of polyvinylalcohol homopolymers and/or anionic polyvinylalcohol copolymers, preferably wherein the polyvinylalcohol copolymers are selected from sulphonated and carboxylated anionic polyvinylalcohol copolymers especially carboxylated anionic polyvinylalcohol copolymers, most preferably the water-soluble film comprises a blend of a polyvinylalcohol homopolymer and a carboxylated anionic polyvinylalcohol copolymer, or a blend of polyvinylalcohol homopolymers. Alternatively, the polyvinylalcohol comprises an anionic polyvinyl alcohol copolymer, most preferably a carboxylated anionic polyvinylalcohol copolymer. When the polyvinylalcohol in the water-soluble film is a blend of a polyvinylalcohol homopolymer and a carboxylated anionic polyvinylalcohol copolymer, the homopolymer and the anionic copolymer are present in a relative weight ratio of 90/10 to 10/90, preferably 80/20 to 20/80, more preferably 70/30 to 50/50. Without wishing to be bound by theory, the term "homopolymer" generally includes polymers having a single type of monomeric repeating unit (e.g., a polymeric chain comprising or consisting of a single monomeric repeating unit). For the case of polyvinylalcohol, the term "homopolymer" typically further includes copolymers having a distribution of vinyl alcohol monomer units and optionally vinyl acetate monomer units, depending on the degree of hydrolysis (e.g., a polymeric chain comprising or consisting of vinyl alcohol and vinyl acetate monomer units). In the case of 100% hydrolysis, a polyvinylalcohol homopolymer can include only vinyl alcohol units. Without wishing to be bound by theory, the term "copolymer" generally includes polymers having two or more types of monomeric repeating units (e.g., a polymeric chain comprising or consisting of two or more different monomeric repeating units, whether as random copolymers, block copolymers, etc.). For the particular case of polyvinylalcohol, the term "copolymer" (or "polyvinylalcohol copolymer") typically further includes copolymers having a distribution of vinyl alcohol monomer units and vinyl acetate monomer units, depending on the degree of hydrolysis, as well as at least one other type of monomeric repeating unit (e.g., a ter-(or higher) polymeric chain comprising or consisting of vinyl alcohol monomer units, vinyl acetate monomer units, and one or more other monomer units, for example anionic monomer units). In the case of 100% hydrolysis, a polyvinylalcohol copolymer can include a copolymer having vinyl alcohol units and one or more other monomer units, but no vinyl acetate units. Without wishing to be bound by theory, the term "anionic copolymer" includes copolymers having an anionic monomer unit comprising an anionic moiety. General classes of anionic monomer units which can be used for the anionic polyvinyl alcohol co-polymer include the vinyl polymerization units corresponding to monocarboxylic acid vinyl monomers, their esters and anhydrides, dicarboxylic monomers having a polymerizable double bond, their esters and anhydrides, vinyl sulfonic acid monomers, and alkali metal salts of any of the foregoing. Examples of suitable anionic monomer units include the vinyl polymerization units corresponding to vinyl anionic monomers including vinyl acetic acid, maleic acid, monoalkyl maleate, dialkyl maleate, monomethyl maleate, dimethyl maleate, maleic anyhydride, fumaric acid, monoalkyl fumarate, dialkyl fumarate, monomethyl fumarate, dimethyl fumarate, fumaric anyhydride, itaconic acid, monomethyl itaconate, dimethyl itaconate, itaconic anhydride, vinyl sulfonic acid, allyl sulfonic acid, ethylene sulfonic acid, 2-acrylamido-1-methylpropanesulfonic acid, 2-acrylamido-2-methylpropanesulfonic acid, 2-methylacrylamido-2-methylpropanesulfonic acid, 2-sufoethyl acrylate, alkali metal salts of the foregoing (e.g., sodium, potassium, or other alkali metal salts), esters of the foregoing (e.g., methyl, ethyl, or other C1-C4 or C6 alkyl esters), and combinations thereof (e.g., multiple types of anionic monomers or equivalent forms of the same anionic monomer). The anionic monomer may be one or more acrylamido methylpropancsulfonic acids (e.g., 2-acrylamido-1-methylpropanesulfonic acid, 2-acrylamido-2-methylpropancsulfonic acid, 2-methylacrylamido-2-methylpropanesulfonic acid), alkali metal salts thereof (e.g., sodium salts), and combinations thereof. Preferably, the anionic moiety of the first anionic monomer unit is selected from a sulphonate, a carboxylate, or a mixture thereof, more preferably a carboxylate, most preferably an acrylate, a methacrylate, a maleate, or a mixture thereof. Preferably, the anionic monomer unit is present in the anionic polyvinyl alcohol copolymer in an average amount in a range of between 1 mol. % and 10 mol. %, preferably between 2 mol. % and 5 mol. %.

Preferably, the polyvinyl alcohol, and/or in case of polyvinylalcohol blends the individual polyvinylalcohol polymers, have an average viscosity (μ1) in a range of between 4 mPa·s and 30 mPa·s, preferably between 10mPa·s and 25 mPa·s, measured as a 4% polyvinyl alcohol polymer solution in demineralized water at 20° C.

The viscosity of a polyvinyl alcohol polymer is typically determined by measuring a freshly made solution using a Brookfield LV type viscometer with UL adapter as described in British Standard EN ISO 15023-2:2006 Annex E Brookfield Test method. It is international practice to state the viscosity of 4% aqueous polyvinyl alcohol solutions at 20° C. It is well known in the art that the viscosity of an aqueous water-soluble polymer solution (polyvinylalcohol or otherwise) is correlated with the weight-average molecular weight of the same polymer, and often the viscosity is used as a proxy for weight-average molecular weight. Thus, the weight-average molecular weight of the polyvinylalcohol can be in a range of 30,000 to 175,000, or 30,000 to 100,000, or 55,000 to 80,000.

Preferably, the polyvinyl alcohol, and/or in case of polyvinylalcohol blends the individual polyvinylalcohol polymers, have an average degree of hydrolysis in a range of between 75% and 99%, preferably between 80% and 95%, most preferably between 85% and 95%.

A suitable test method to measure the degree of hydrolysis is as according to standard method JIS K6726.

Preferably, the water-soluble film comprises a non-aqueous plasticizer. Preferably, the non-aqueous plasticizer is selected from polyols, sugar alcohols, and mixtures thereof. Suitable polyols include polyols selected from the group consisting of glycerol, diglycerin, ethylene glycol, diethylene glycol, tricthyleneglycol, tetracthylene glycol, polyethylene glycols up to 400 molecular weight, neopentyl glycol, 1,2-propylene glycol, 1,3-propanediol, dipropylene glycol, polypropylene glycol, 2-methyl-1,3-propanediol, trimethylolpropane and polyether polyols, or a mixture thereof. Suitable sugar alcohols include sugar alcohols selected from the group consisting of isomalt, maltitol, sorbitol, xylitol, erythritol, adonitol, dulcitol, pentaerythritol and mannitol, or a mixture thereof. More preferably the non-aqueous plasticizer is selected from glycerol, 1,2-propanediol, dipropylene glycol, 2-methyl-1,3-propanediol, trimethylolpropane, tricthyleneglycol, polyethyleneglycol, sorbitol, or a mixture thereof, most preferably selected from glycerol, sorbitol, trimethylolpropane, dipropylene glycol, and mixtures thereof. One particularly suitable plasticizer system includes a blend of glycerol, sorbitol and trimethylol propane. Another particularly suitable plasticizer system includes a blend of glycerin, dipropylene glycol, and sorbitol. Preferably, the film comprises between 5% and 50%, preferably between 10% and 40%, more preferably between 20% and 30% by weight of the film of the non-aqueous plasticizer.

Preferably, the water-soluble film comprises a surfactant. Preferably, the water-soluble film comprises a surfactant in an amount between 0.1% and 2.5%, preferably between 1% and 2% by weight of the water-soluble film. Suitable surfactants can include the nonionic, cationic, anionic and zwitterionic classes. Suitable surfactants include, but are not limited to, polyoxyethylenated polyoxypropylene glycols, alcohol ethoxylates, alkylphenol ethoxylates, tertiary acetylenic glycols and alkanolamides (nonionics), polyoxyethylenated amines, quaternary ammonium salts and quaternized polyoxyethylenated amines (cationics), and amine oxides, N-alkylbetaines and sulfobetaines (zwitterionics). Other suitable surfactants include dioctyl sodium sulfosuccinate, lactylated fatty acid esters of glycerol and propylene glycol, lactylic esters of fatty acids, sodium alkyl sulfates, polysorbate 20, polysorbate 60, polysorbate 65, polysorbate 80, lecithin, acetylated fatty acid esters of glycerol and propylene glycol, and acetylated esters of fatty acids, and combinations thereof.

Preferably, the water-soluble film comprises lubricants/release agents. Suitable lubricants/release agents include fatty acids and their salts, fatty alcohols, fatty esters, fatty amines, fatty amine acetates and fatty amides. Preferred lubricants/release agents are fatty acids, fatty acid salts, and fatty amine acetates. The amount of lubricant/release agent in the water-soluble film is typically in a range of from 0.02% to 1.5%, preferably from 0.1% to 1% by weight of the water-soluble film.

Preferably, the water-soluble film comprises fillers, extenders, antiblocking agents, detackifying agents or a mixture thereof. Suitable fillers, extenders, antiblocking agents, detackifying agents or a mixture thereof include starches, modified starches, crosslinked polyvinylpyrrolidone, crosslinked cellulose, microcrystalline cellulose, silica, metallic oxides, calcium carbonate, talc and mica. Preferred materials are starches, modified starches and silica.

Preferably, the amount of filler, extender, antiblocking agent, detackifying agent or mixture thereof in the water-soluble film is in a range of from 0.1% to 25%, preferably from 1% to 10%, more preferably from 2% to 8%, most preferably from 3% to 5% by weight of the water-soluble film. In the absence of starch, one preferred range for a suitable filler, extender, antiblocking agent, detackifying agent or mixture thereof is from 0.1% to 1%, preferably 4%, more preferably 6%, even more preferably from 1% to 4%, most preferably from 1% to 2.5%, by weight of the water-soluble film.

Preferably the water-soluble film has a residual moisture content of at least 4%, more preferably in a range of from 4% to 15%, even more preferably of from 5% to 10% by weight of the water-soluble film, typically as measured by Karl Fischer titration.

Preferred water-soluble films exhibit good dissolution in cold water, meaning unheated distilled water. Preferably, such water-soluble films exhibit good dissolution at temperatures of 24° C., even more preferably at 10° C. By good dissolution it is typically meant that the water-soluble film exhibits a water-solubility of at least 50%, preferably at least 75% or even at least 95%, as measured by the method set out here after using a glass-filter with a maximum pore size of 20 microns, described above.

Preferred films include those supplied by Monosol under the trade references M8630, M8900, M8779, M8310.

The film may be opaque, transparent, or translucent.

The film may comprise a printed area. The area of print may be achieved using standard techniques, such as flexographic printing or inkjet printing. Preferably, the ink used in the printed area comprises between 0 ppm and 20 ppm, preferably between 0 ppm and 15 ppm, more preferably between 0 ppm and 10 ppm, even more preferably between 0 ppm and 5 ppm, even more preferably between 0 ppm and 1 ppm, even more preferably between 0 ppb and 100 ppb, most preferably 0 ppb dioxane. Those skilled in the art will be aware of known methods and techniques to determine the dioxane level within the ink formulations.

The film may comprise an aversive agent, for example a bittering agent. Suitable bittering agents include, but are not limited to, naringin, sucrose octaacetate, quinine hydrochloride, denatonium benzoate, or mixtures thereof. Any suitable level of aversive agent may be used in the film. Suitable levels include, but are not limited to, 1 to 5000 ppm, or even 100 to 2500 ppm, or even 250 to 2000 ppm.

Preferably, the water-soluble film or water-soluble unit dose article or both are coated in a lubricating agent, preferably, wherein the lubricating agent is selected from talc, zinc oxide, silicas, siloxanes, zeolites, silicic acid, alumina, sodium sulphate, potassium sulphate, calcium carbonate, magnesium carbonate, sodium citrate, sodium tripolyphosphate, potassium citrate, potassium tripolyphosphate, calcium stearate, zinc stearate, magnesium stearate, starch, modified starches, clay, kaolin, gypsum, cyclodextrins or mixtures thereof.

Preferably, the water-soluble film, and each individual component thereof, independently comprises between 0 ppm and 20 ppm, preferably between 0 ppm and 15 ppm, more preferably between 0 ppm and 10 ppm, even more preferably between 0 ppm and 5 ppm, even more preferably between 0 ppm and 1ppm, even more preferably between 0 ppb and 100 ppb, most preferably 0 ppb dioxane. Those skilled in the art will be aware of known methods and techniques to determine the dioxane level within water-soluble films and ingredients thereof.

Automatic Dishwashing Detergent Composition

Typically, the composition is in solid form and/or liquid form. Preferably, the composition comprises a solid component and a liquid component. The solid component and/or liquid component are typically contained within separate compartments within the pouch. Typically, these separate compartments are separated by water-soluble film. These separate compartments can be in a side-by-side configuration, or (and preferably) in a superposed configuration. Typically, the compartment(s) containing the liquid component is/are superposed on top of the compartment(s) comprising the solid component. The solid component is typically contained within one compartment within the pouch. The liquid component is typically contained within more than one compartment within the pouch, such as two or more compartments, or three or more compartments, or four or more compartments, or five or more compartments, or even six or more compartments, and preferably from 2 to 10 compartments, or from 3 to 9 compartments, or from 4 to 8 compartments, or even from 5 to 7 compartments.

The liquid component, or part thereof, may be contained within a compartment that also contains the solid component, or part thereof. It may be preferred that the liquid component, or part thereof, forms a continuous phase within the compartment, and the solid component, or part thereof, forms a discontinuous phase.

The solid component, or part thereof, may be in the form of a free-flowing powder, or a tablet, preferably a free-flowing powder. The free-flowing powder may be compressed when contained in a compartment of the pouch.

The solid component, especially when in free-flowing powder form, can have a bulk density in the range of from 400 g/l to 1200 g/l, or from 600 g/l to 1000 g/l.

The liquid component, or part thereof, may be a free-flowing liquid, or may be a viscous liquid. The liquid component, or part thereof, may be a gel.

The liquid component, or part thereof, can have a viscosity in the range of from 50 cP to 750 cP, or from 100 cP to 500 cP.

Viscosity is typically measured using a rheometer. The viscosity is typically measured at a function of shear rate of from 1.0 $s^{-1}$ to 1500 $s^{-1}$, and at a temperature of from 10° C. to 30° C.

The composition typically comprises one or more of an alkalinity system, a bleach system, a builder system, a chelant system, an enzyme system, a polymer system, and a surfactant system. The composition can also include other detergent ingredients.

Solid detergent ingredients are typically comprised by the solid component. Liquid detergent ingredients are typically comprised by the liquid component. However, a liquid detergent ingredient can be formulated into a solid particle: e.g., by loading onto a solid carrier material, or a liquid ingredient can be sprayed-on or agglomerated into the solid component. In this manner, a liquid detergent ingredient can be comprised by the solid component.

The alkalinity system, or part thereof, can be comprised by the liquid component and/or the solid component. Typically, the alkalinity system, or part thereof, is comprised by the solid component.

The bleach system, or part thereof, can be comprised by the liquid component and/or the solid component. Typically, the bleach system, or part thereof, is comprised by the solid component.

The builder system, or part thereof, can be comprised by the liquid component and/or the solid component. Typically, the builder system, or part thereof, is comprised by the solid component.

The chelant system, or part thereof, can be comprised by the liquid component and/or the solid component. Typically, the chelant system, or part thereof, is comprised by the solid component.

The enzyme system, or part thereof, can be comprised by the liquid component and/or the solid component. The enzyme system, or part thereof, may be comprised by the liquid component. The enzyme system, or part thereof, may be comprised by the solid component. Part of the enzyme system may be comprised by the liquid component and part of the enzyme system may be comprised by the solid component.

The polymer system, or part thereof, can be comprised by the liquid component and/or the solid component. The polymer system, or part thereof, may be comprised by the solid component. Part of the polymer system may be comprised by the liquid component and part of the polymer system may be comprised by the solid component.

The surfactant system, or part thereof, can be comprised by the liquid component and/or the solid component. The surfactant system, or part thereof, may be comprised by the liquid component. The surfactant system, or part thereof, may be comprised by the solid component. Part of the surfactant system may be comprised by the liquid component and part of the surfactant system may be comprised by the solid component.

The composition, upon dissolution in deionized water at 20° C. to a concentration of 1.0 g/l, may have an equilibrium pH in the range of from 3.0 to 12.0, or from 5.0 to 12.0, or from 6.0 to 12.0, or from 7.0 to 12.0, or from above 7.0 to 12.0, or from 8.0 to 12.0, or from 9.0 to 12.0, or from 10.0 to 12.0,or from 10.0 to 11.5, or from 10.0 to 11.0.

In use, the composition, upon contact with water, may form a wash liquor having a pH profile in the range of from 3.0 to 12.0, or from 5.0 to 12.0, or from 6.0 to 12.0, or from 7.0 to 12.0, or from above 7.0 to 12.0, or from 8.0 to 12.0, or from 9.0 to 12.0, or from 10.0 to 12.0, or from 10.0 to 11.5, or from 10.0 to 11.0.

Dishwashing Detergent Ingredients

Suitable detergent ingredients can be described in terms of systems. The composition typically comprises one or more of an alkalinity system, a bleach system, a builder system, a chelant system, an enzyme system, a polymer system, and a surfactant system. Suitable detergent ingredients can also include other detergent ingredients.

Alkalinity System

The alkalinity system typically achieves the target pH profile of the composition. The pH profile of the composition impacts the cleaning profile of the composition. Alkalinity typically provides soil swelling and soil dispersion performance, as well as providing the optimal pH for other detergent ingredients to work, such as the bleach system, builder system, chelant system and enzyme system.

The composition typically comprises from 1.0 g to 10 g alkalinity system. The amount of alkalinity system is typically determined by the desired pH profile of the composition.

The composition may comprise, by weight of the composition, from 10 wt % to 35 wt %, or from 11 wt % to 34 wt %, or from 25 wt % to 36 wt %, or from 25 wt % to 35 wt % alkaline system.

The solid component may comprise, by weight of the solid component, from 10 wt % to 35 wt %, or from 11 wt % to 34 wt %, or from 25 wt % to 36 wt %, or from 25 wt % to 35 wt % alkaline system.

Any suitable source of alkalinity can be used. Suitable sources of alkalinity are organic alkaline ingredients and inorganic alkaline ingredients.

A suitable alkalinity system comprises ingredients selected from carbonate salts, silicate salts, and sources of hydroxide anions.

The composition can comprise from 1.0 g to 10 g carbonate salt.

Preferred carbonate salts are selected from alkali metal salts of carbonate and/or alkaline earth metal salts of carbonate. Preferred carbonate salts are selected from magnesium carbonate, potassium carbonate, sodium carbonate, and any combination thereof, most preferably sodium carbonate.

Preferably, the composition comprises from 1.0 g to 10 g sodium carbonate.

The composition can comprise from 0.1 g to 5.0 g silicate salt.

The composition may comprise, by weight of the composition, from 1.0 wt % to 20 wt %, or from 1.0 wt % to 17 wt % silicate salt.

The solid component may comprise, by weight of the solid component, from 3.0 wt % to 20 wt %, or from 3.0 wt % to 18 wt % silicate salt.

The liquid component may comprise, by weight of the liquid component, from 20 wt % to 50 wt % silicate salt.

Preferred silicate salts are selected from alkali metal salts of silicate and/or alkaline earth metal salts of silicate. Preferred silicate salts are selected from magnesium silicate, potassium silicate, sodium silicate, and any combination thereof, most preferably sodium silicate. Preferred sodium silicates have a weight ratio $SiO_2$ to $Na_2O$ ratio of from 1.0:1 to 3.5:1, preferably from 1.5:1 to 2.5:1, most preferably 2.0:1 (sodium disilicate).

Preferably, the composition comprises from 0.1 g to 5.0 g sodium silicate.

The composition may comprise from 0.01 g to 2.0 g source of hydroxide.

The composition may comprise, by weight of the composition, from 0.10 wt % to 10 wt %, or from 0.10 wt % to 8.0 wt %, or from 0.11 wt % to 6.7 wt % source of hydroxide.

Preferred sources of hydroxide are selected from alkali metal hydroxide and/or alkaline earth metal hydroxide. Preferred sources of hydroxide are selected from magnesium hydroxide, potassium hydroxide, sodium hydroxide, and any combination thereof, most preferably sodium hydroxide.

Bleach System

Typically, the bleach system provides cleaning and disinfection benefits.

Typically, the composition comprises from 0.1 g to 10 g bleach system.

The composition may comprise, by weight of the composition, from 1.0 wt % to 40 wt %, or from 1.0 wt % to 35 wt %, or from 1.0 wt % to 33.7 wt % bleach system.

The solid component may comprise, by weight of the solid component, from 2.5 wt % to 35.7 wt % bleach system.

The bleach system typically comprises a source of peroxygen, often in combination with a bleach activator and/or a bleach catalyst.

Typically, the composition comprises from 0.1 g to 10 g, or from 1.0 g to 8.0 g, or from 2.0 g to 6.0 g source of peroxygen.

Any suitable source of peroxygen can be used. A suitable source of peroxygen is a perhydrate salt, especially alkali metal perhydrate salts and/or alkaline earth metal perhydrate salts, preferably alkali metal perhydrate salts. Suitable perhydrate salts are selected from perborate salt, percarbonate salt, perphosphate salt, persilicate salt, persulfate salt and any combination thereof.

The perhydrate salt may be a crystalline solid without additional protection. Alternatively, the perhydrate salt can be coated. Suitable coatings are selected from sodium carbonate, sodium silicate, sodium sulphate, and any combination thereof.

A preferred perhydrate salt is an alkali metal percarbonate, especially preferred is sodium percarbonate. The percarbonate is preferably in a coated form. The coating provides in-product stability.

The composition may comprise from 1.0 g to 10 g, or from 2.0 g to 6.0 g sodium percarbonate.

The composition may comprise, by weight of the composition, from 10 wt % to 35 wt %, or from 11 wt % to 34 wt % sodium percarbonate.

The solid component may comprise, by weight of the solid component, from 25 wt % to 40 wt %, or from 25 wt % to 36 wt % sodium percarbonate.

Another suitable source of peroxygen is a pre-formed peracid. A preferred pre-formed peracid is phthalimidoperoxycaproic acid (PAP).

The composition may comprise from 0.1 g to 5.0 g phthalimidoperoxycaproic acid (PAP).

The composition may comprise, by weight of the composition, from 1.0 wt % to 20 wt %, or from 1.0 wt % to 17 wt % phthalimidoperoxycaproic acid (PAP).

The solid component may comprise, by weight of the solid component, from 2.5 wt % to 20 wt %, or from 2.5 wt % to 18 wt % phthalimidoperoxycaproic acid (PAP).

The composition may comprise a bleach activator. The composition may comprise from 0.05 g to 2.0 g, preferably from 0.1 g to 2.0 g, bleach activator.

The composition may comprise, by weight of the composition, from 0.5 wt % to 10 wt %, or from 0.5 wt % to 7.0 wt % bleach activator.

Any suitable bleach activator can be used. Bleach activators are typically used to enhance the bleaching performance at temperatures of 60° C. and below.

A suitable bleach activator is an organic peracid precursor. Suitable bleach activators are compounds which, under perhydrolysis conditions, give aliphatic peroxycarboxylic acids having preferably from 1 to 12 carbon atoms, in particular from 2 to 10 carbon atoms, and/or optionally substituted perbenzoic acid. Suitable bleach activators comprise O-acyl and/or N-acyl groups of the number of carbon atoms specified and/or optionally substituted benzoyl groups. Preferred bleach activators are polyacylated alkylenediamines. A highly preferred bleach activator is tetraacetylethylenediamine (TAED).

The composition may comprise from 0.05 g to 2.0 g, preferably from 0.1 g to 2.0 g, tetraacetylethylenediamine (TAED).

The composition may comprise a bleach catalyst. The composition may comprise from 0.1 mg to 20 mg, preferably from 0.5 mg to 10 mg, bleach catalyst.

The composition may comprise, by weight of the composition, from 0.001 wt % to 0.10 wt %, or from 0.001 wt % to 0.07 wt % bleach catalyst.

Any suitable bleach catalyst can be used.

Suitable bleach catalysts are metal-containing bleach catalysts, preferably transition-metal-containing bleach catalysts. Preferred transition-metal-containing bleach catalysts are selected from cobalt-containing bleach catalysts, iron-containing bleach catalysts, manganese-containing bleach catalysts, and any combination thereof.

Suitable manganese-containing bleach catalysts comprise manganese in an oxidation state of (II), (III), (IV), (v), or any combination thereof, preferably (IV).

Suitable manganese-containing bleach catalyst includes manganese triazacyclononane and related complexes, such as 1,4,7-triazacyclononane (TACN).

The composition may comprise from 0.1 mg to 20 mg, preferably from 0.5 mg to 10 mg, transition-metal-containing bleach catalyst. The composition may comprise from 0.1 mg to 20 mg, preferably from 0.5 mg to 10 mg, cobalt-containing bleach catalyst. The composition may comprise from 0.1 mg to 20 mg, preferably from 0.5 mg to 10 mg, iron-containing bleach catalyst. The composition may comprise from 0.1 mg to 20 mg, preferably from 0.5 mg to 10 mg, manganese-containing bleach catalyst.

Builder System

The composition may comprise from 1.0 g to 10 g builder system.

The composition may comprise, by weight of the composition, from 10 wt % to 35 wt %, or from 11 wt % to 34 wt % builder system.

The solid component may comprise, by weight of the solid component, from 25 wt % to 40 wt %, or from 25 wt % to 36 wt % builder system.

The builder system typically comprises detergent ingredients that are complexing agents. Suitable builder complexing agents are capable of sequestering hardness cations, especially calcium cations and/or magnesium cations.

Typically, the builder system controls the hardness of the wash liquor, which in turn aids the cleaning performance and soil suspension performance of the composition. The builder system can also extract calcium and magnesium cations from the soil, which also improves the cleaning performance of the composition.

Any suitable builder complexing agent can be used. Suitable builder complexing agents may also be able to complex other cations, such as transition metal cations.

A preferred builder complexing agent is selected from aminopolycarboxylic acids and/or salts thereof, carboxylic acids and/or salts thereof, and any combination thereof. Suitable aminopolycarboxylic acids and/or salts thereof are selected from methylglycine-N,N-diacetic acid and/or salts thereof (MGDA), glutamic acid diacetic acid and/or salts thereof (GLDA), iminodisuccinic acid and/or salts thereof (IDS); hydroxyethylciminodiacetic acid and/or salts thereof (HEIDA), and any combination thereof, preferably methylglycine-N,N-diacetic acid and/or salts thereof (MGDA) and/or glutamic acid diacetic acid and/or salts thereof (GLDA), most preferably methylglycine-N,N-diacetic acid and/or salts thereof (MGDA). A suitable builder complexing agent is the tri-sodium salt of methylglycine-N,N-diacetic acid.

A suitable aminopolycarboxylic acid and/or salts thereof is ethylene diamine disuccinic acid and/or salts thereof (EDDS).

Suitable carboxylic acids and/or salts thereof can be dicarboxylic acids and/or salts thereof, such as glucaric acid and/or salts thereof, itaconic acid and/or salts thereof, maleic acid and/or salts thereof, succinic acid and/or salts thereof, tartaric acid and/or salts thereof, and any combination thereof.

Suitable carboxylic acids and/or salts thereof can be tricarboxylic acids and/or salts thereof, A suitable carboxylic acid and/or salts thereof is citric acid and/or salts thereof. A suitable builder complexing agent is sodium citrate.

The composition may comprise a builder complexing agent selected from methylglycine-N,N-diacetic acid and/or salts thereof (MGDA) and/or citric acid and/or salts thereof. The composition may comprise the combination of methylglycine-N,N-diacetic acid and/or salts thereof (MGDA) and/or citric acid and/or salts thereof.

The composition may comprise from 1.0 g to 10 g methylglycine-N,N-diacetic acid and/or salts thereof (MGDA). Any suitable methylglycine-N,N-diacetic acid and/or salt thereof (MGDA) can be used. Preferably, the MGDA is the salt form of methylglycine-N,N-diacetic acid, more preferably the MGDA is the tri-sodium salt of methylglycine-N,N-diacetic acid.

The composition may comprise from 1.0 g to 10 g citric acid and/or salts thereof.

The presence of citric acid and/or salt thereof can be in conjunction with MGDA, or independently thereof.

Chelant System

The composition may comprise from 0.1 g to 5.0 g chelant system.

The composition may comprise, by weight of the composition, from 1.0 wt % to 20 wt %, or from 1.0 wt % to 17 wt % chelant system.

The solid component may comprise, by weight of the solid component, from 2.5 wt % to 20 wt %, or from 2.5 wt % to 18 wt % chelant system.

The chelant system typically comprising chelating agents. Suitable chelating agents can chelate transition metal cations, especially copper, iron and zinc.

Typically, the chelant system stabilizes the bleaching system by protecting the bleach from transition metal cation degradation. The chelant system can also extract transition metal cations from soils, such as tea soils.

Any suitable chelating agent can be used. Suitable chelating agents may also be able to complex other cations, such as hardness cations like calcium and magnesium.

Suitable chelating agents are selected from phosphonic acids and/or salts thereof. Phosphonic acids and/or salts thereof typically provide crystal growth inhibition performance.

A preferred phosphonic acid and/or salts thereof is selected from: 1-hydroxy ethylidene-1,1 diphosphonic acid and/or salts thereof (HEDP), amino trimethyl phosphonic acid and/or salts thereof (ATMP), diethylene triamine pentamethylene phosphonic acid and/or salts thereof (DTMP), 2-phosphono 1,2,4-butane tricarboxylic acid and/or salts thereof (PBTC), and any combination thereof, preferably 1-hydroxy ethylidene-1,1 diphosphonic acid and/or salts thereof (HEDP). A suitable chelating agent is the tetrasodium salt of 1-hydroxy ethylidene-1,1 diphosphonic acid.

The composition may comprise from 0.1 g to 5.0 g chelating agent. The composition may comprise from 0.1 g to 1.5 g 1-hydroxy ethylidene-1,1 diphosphonic acid and/or salts thereof (HEDP).

The composition may comprise, by weight of the composition, from 1.0 wt % to 5.0 wt % 1-hydroxy ethylidene-1,1 diphosphonic acid and/or salts thereof (HEDP).

The solid component may comprise, by weight of the solid component, from 2.5 wt % to 6.0 wt %, or from 2.5 wt % to 5.0 wt % 1-hydroxy ethylidene-1,1 diphosphonic acid and/or salts thereof (HEDP).

Enzyme System

The composition may comprise from 1.0 mg to 400 mg enzyme system.

The enzyme system provides cleaning benefits.

The enzyme typically comprises an enzyme selected from amylase, cellulase, lipase, protease and any combination thereof. Preferably, the enzyme system comprises an amylase and/or a protease.

The composition typically comprises, on an active enzyme basis, from 1.0 mg to 300 mg of each enzyme type included in the composition.

The composition may comprise, by weight of the composition and on an active enzyme basis, from 0.01 wt % to 1.0 wt % of each enzyme type included in the composition.

The solid component may comprise, by weight of the solid component and on an active enzyme basis, from 0.03 wt % to 1.07 wt % of each enzyme type included in the solid component.

The composition may comprise, on an active enzyme basis, from 10.0 mg to 300 mg protease and from 2.0 mg to 30 mg amylase.

The composition may comprise, by weight of the composition and on an active enzyme basis, from 0.11 wt % to 1.01 wt % protease.

The solid component may comprise, by weight of the solid component and on an active enzyme basis, from 0.25 wt % to 1.07 wt % protease.

The composition may comprise, by weight of the composition and on an active enzyme basis, from 0.022 wt % to 0.10 wt % amylase.

The solid component may comprise, by weight of the solid component and on an active enzyme basis, from 0.05 wt % to 0.11 wt % amylase.

Suitable enzymes can be in the form of granulates. Suitable enzyme granulates comprise less than 29 wt % of sodium sulphate. Suitable granulates comprise sodium sulphate in an amount such that the weight ratio of the sodium sulphate and enzyme (on an active enzyme basis) is less than 4:1.

Polymer System

The composition may comprise from 0.1 g to 5.0 g, or from 0.5 g to 2.0 g polymer system.

The composition may comprise, by weight of the composition, from 1.0 wt % to 20 wt %, or from 1.11 wt % to 17 wt % polymer system.

The liquid component may comprise, by weight of the liquid component, from 15 wt % to 60 wt %, or from 20 wt % to 50 wt % polymer system.

The solid component may comprise, by weight of the solid component, from 2.5 wt % to 20 wt %, or from 2.5 wt % to 18 wt % polymer system.

The polymer system can act as soil dispersant as well, as a co-builder to help complex hardness cations such as calcium and magnesium.

The polymer system typically comprises polymers. Suitable polymers are selected from modified polyamine polymers, modified polysaccharide polymers, polyalkylene oxide polymers, polycarboxylate polymers, silicone polymers, terephthalate polymers, other polyester polymers, and any combination thereof.

Preferably, the polymer system comprises polymers selected from polyamine polymers, modified polysaccharide polymers, polyalkylene oxide polymers, polycarboxylate polymers, and any combination thereof, most preferably, polycarboxylate polymers.

The composition may comprise from 0.1 g to 5.0 g, or from 0.5 g to 2.0 g polycarboxylate polymers.

Surfactant System

Typically, the surfactant system provides cleaning benefits, shine benefits, water drainage and drying benefits. The surfactant system can act to remove soil and suspend soil.

The composition may comprise from 0.5 g to 5.0 g, or from 0.6 g to 4.0 g, or from 0.7 g to 3.0 g surfactant system.

The composition may comprise, by weight of the composition, from 5.0 wt % to 20 wt %, or from 5.5 wt % to 17 wt % surfactant system.

The liquid component may comprise, by weight of the liquid component, from 40 wt % to 100 wt %, or from 50 wt % to 100 wt %, or from 50 wt % to 99 wt %, or from 50 wt % to 90 wt % surfactant system.

The solid component may comprise, by weight of the solid component, from 10 wt % to 20 wt %, or from 12.5 wt % to 18 wt % surfactant system.

The surfactant system can comprise amphoteric surfactant, anionic surfactant, cationic surfactant, nonionic surfactant, zwitterionic surfactant, and any combination thereof. Most preferably, the surfactant system comprises nonionic surfactant.

The surfactant system typically comprises a surfactant, typically one or more, preferably two or more, or three or more, or four or more, or even five or more different types of surfactants, and preferably from 2 to 8, or 3 to 7, or 4 to 6 different types of surfactants.

The surfactant system may have a phase inversion temperature, as measured at a concentration of 1 wt % in distilled water, between 20° C. and 70° C., preferably between 35° C. and 65° C. Phase inversion temperature is the temperature below which a surfactant system partitions preferentially into the water phase (typically as oil-swollen micelles), and above which the surfactant system partitions preferentially into the oil phase (typically as water swollen inverted micelles). Phase inversion temperature can be determined visually by identifying at which temperature cloudiness occurs. The phase inversion temperature of the surfactant system can be determined as follows: a solution containing 1 wt % of the surfactant system, by weight of the solution in distilled water, is prepared. The solution is stirred gently before phase inversion temperature analysis to ensure that the process occurs in chemical equilibrium. The phase inversion temperature is taken in a thermostable bath by immersing the solutions in 75 mm sealed glass test tube. To ensure the absence of leakage, the test tube is weighed before and after phase inversion temperature measurement. The temperature is gradually increased at a rate of less than 1° C. per minute, until the temperature reaches a few degrees below the pre-estimated phase inversion temperature. Phase inversion temperature is determined visually at the first sign of turbidity.

The surfactant system is typically a low foaming surfactant system.

Preferably, the surfactant system comprises a surfactant selected from:

(i) R—O-$EO_x$H, wherein R is a $C_6$-$C_{18}$ alkyl, and x is from 1 to 30; or (ii) R—O-$EO_xPO_y$H, wherein R is a $C_6$-$C_{18}$ alkyl, x is from 1 to 20, and y is from 1 to 20; or (iii) R—O—$PO_xEO_y$H, wherein R is a $C_6$-$C_{18}$ alkyl, x is from 1 to 20, and y is from 1 to 20; or (iv) R—O-$EO_xPO_yEO_z$H, wherein R is a $C_6$-$C_{18}$ alkyl, x is y from 1 to 20, y is from 1 to 20, and z is from 1 to 20; or (v) R—O—$PO_xEO_yPO_z$H, wherein R is a $C_6$-$C_{18}$ alkyl, x is from 1 to 20, y is from 1 to 20, and z is from 1 to 20; or (vi) HO-$EO_xPO_yEO_z$H, wherein, x is from 1 to 50, y is from 1 to 50, and z is from 1 to 50; or (vii) HO—$P_xEO_yPO_z$H, wherein x is from 1 to 50, y is from 1 to 50, and z is from 1 to 20; or (viii) any combination thereof.

For the above surfactants (i) to (v) above, the alkyl moiety can be linear or branched, and can be derived from a guerbet alcohol, or can derived from an oxo-alcohol.

Suitable surfactants are non-ionic surfactants.

A suitable surfactant has the formula: R—O-$EO_x$H, wherein R is a $C_6$-$C_{18}$ alkyl, and x is from 1 to 30. Suitable surfactants are Lutensol AO series of surfactants from BASF and Lutensol TO series of surfactants from BASF.

A suitable surfactant has the formula: R—O-$EO_xPO_y$H, wherein R is a $C_6$-$C_{18}$ alkyl, x is from 1 to 20, and y is from 1 to 20. Suitable surfactants are Dehypon LS series of surfactants from BASF.

A suitable surfactant has the formula: R—O—$PO_yEO_xH$, wherein R is a $C_6$-$C_{18}$ alkyl, x is from 1 to 20, and y is from 1 to 20. Suitable surfactants are Ecosurf EH series of surfactants from Dow.

A suitable surfactant has the formula: R—O-$EO_x$-$PO_yEO_xH$, wherein R is a $C_6$-$C_{18}$ alkyl, each x is independently from 1 to 20, and y is from 1 to 20. A suitable surfactant is Plurafac LF403 from BASF.

A suitable surfactant has the formula: R—O—$PO_yEO_x$-$PO_yH$, wherein R is a $C_6$-$C_{18}$ alkyl, x is from 1 to 20, and each y is independently from 1 to 20. A suitable surfactant is Plurafac SLF180 from BASF.

A suitable surfactant has the formula: HO-$EO_xPO_yEO_xH$, wherein, each x is independently from 1 to 50, and y is from 1 to 50. Suitable surfactants are the Pluronic PE series of surfactants from BASF, and the Tergitol L series of surfactants from Dow.

A suitable surfactant has the formula: HO—$PO_yEO_x$-$PO_yH$, wherein x is from 1 to 50, and each y is independently from 1 to 50. Suitable surfactants are the Pluronic RPE series of surfactants from BASF.

Other suitable surfactants include hydroxy mixed ether surfactants. The hydroxy mixed ether surfactants can be modified and/or endcapped. Suitable hydroxy mixed ether surfactants are Dehypon E127 and Dehypon GRA, both from BASF.

A suitable surfactant is amine oxide,

A suitable surfactant is betaine.

A suitable surfactant is an anionic surfactant selected from alkyl ether sulphates, alkyl sulphates, alkyl sulphonates, and any combination thereof.

Other Ingredients

Other suitable ingredients include aesthetic ingredients, fillers, glass care ingredients, metal care ingredients, perfumes, solvents, suds control agents, and any combination thereof.

Suitable fillers include sulphate salts. Suitable sulphate salts are alkali metal salts of sulphate and/or alkaline earth metal salts of sulphate. Preferred sulphate salts are selected from magnesium sulphate, sodium sulphate, and any combination thereof, most preferably sodium sulphate.

Suitable glass care ingredients include zinc-containing compounds. Suitable zinc-containing compounds include hydrozincite.

Suitable metal care ingredients include benzotriazole (BTA), tolyltriazole (TTA), their salt-forms, and any combination thereof. Preferred salt-forms are sodium forms of BTA and TTA.

Suitable solvents include alkanolamines, polyethers, polyols, and any combination thereof.

Suitable alkanolamines are selected from monoethanolamine, diethanolamine, triethanolamine, and any combination thereof.

Suitable polyethers are selected from glycerol ethers, polyethyleneglycol (PEG), polypropyleneglycol (PPG), glycol ethers, and any combination thereof. Suitable glycol ethers are the E-series and P-series of glycol ethers from Dow.

Suitable polyols are selected from propanediol, glycerol, sorbitol, and any combination thereof.

The solvent can act as a process aid and/or a benefit agent.

Laundry Detergent Composition

In some examples the detergent product comprises a laundry detergent composition. The detergent composition may comprise a solid, a liquid or a mixture thereof. The detergent composition according to this invention at minimum comprises a solid component. The term liquid includes a gel, a solution, a dispersion, a paste, or a mixture thereof. The solid may be a powder. By powder we herein mean that the detergent composition may comprise solid particulates or may be a single homogenous solid. In some examples, the powder detergent composition comprises particles. This means that the powder detergent composition comprises individual solid particles as opposed to the solid being a single homogenous solid. The particles may be free-flowing or may be compacted. A laundry detergent composition can be used in a fabric hand wash operation or may be used in an automatic machine fabric wash operation, for example in an automatic machine fabric wash operation. Example laundry detergent compositions comprise a non-soap surfactant, wherein the non-soap surfactant comprises an anionic non-soap surfactant and a non-ionic surfactant. In some examples, the laundry detergent composition comprises between 10% and 60%, or between 20% and 55% by weight of the laundry detergent composition of the non-soap surfactant. Example weight ratio of non-soap anionic surfactant to nonionic surfactant are from 1:2 to 20:1, from 1:1 to 15:1, from 1.25:1 to 10:1, or from 1.5:1 to 5:1. Example non-soap anionic surfactants comprises linear alkylbenzene sulphonate, alkyl sulphate anionic surfactant or a mixture thereof. Example weight ratio of linear alkylbenzene sulphonate to alkyl sulphate anionic surfactant are from 1:2 to 9:1, from 1:1 to 7:1, from 1:1 to 5:1, or from 1:1 to 4:1. Example linear alkylbenzene sulphonates are $C_{10}$-$C_{16}$ alkyl benzene sulfonic acids, or $C_{11}$-$C_{14}$ alkyl benzene sulfonic acids. By 'linear', we herein mean the alkyl group is linear. Example alkyl sulphate anionic surfactant may comprise alkoxylated alkyl sulphate or non-alkoxylated alkyl sulphate or a mixture thereof. Example alkoxylated alkyl sulphate anionic surfactant comprise an ethoxylated alkyl sulphate anionic surfactant. Example alkyl sulphate anionic surfactant may comprise an ethoxylated alkyl sulphate anionic surfactant with a mol average degree of ethoxylation from 1 to 5, from 1 to 3, or from 2 to 3. Example alkyl sulphate anionic surfactant may comprise a non-ethoxylated alkyl sulphate and an ethoxylated alkyl sulphate wherein the mol average degree of ethoxylation of the alkyl sulphate anionic surfactant is from 1 to 5, from 1 to 3, or from 2 to 3. Example alkyl fraction of the alkyl sulphate anionic surfactant are derived from fatty alcohols, oxo-synthesized alcohols, Guerbet alcohols, or mixtures thereof. In some examples, the laundry detergent composition comprises between 10% and 50%, between 15% and 45%, between 20% and 40%, or between 30% and 40% by weight of the laundry detergent composition of the non-soap anionic surfactant. In some examples, the non-ionic surfactant is selected from alcohol alkoxylate, an oxo-synthesised alcohol alkoxylate, Guerbet alcohol alkoxylates, alkyl phenol alcohol alkoxylates, or a mixture thereof. In some examples, the laundry detergent composition comprises between 0.5% and 30%, between 1% and 25%, between 3% and 20%, or between 5% and 15% by weight of the laundry detergent composition of a non-ionic surfactant. In some examples, the laundry detergent composition comprises between 1.5% and 20%, between 2% and 15%, between 3% and 10%, or between 4% and 8% by weight of the laundry detergent composition of soap, in some examples a fatty acid salt, in some examples an amine neutralized fatty acid salt, wherein in some examples the amine is an alkanolamine for example selected from monocthanolamine, diethanolamine, triethanolamine or a mixture thereof, in some examples monoethanolamine. In some examples, the laundry detergent composition is a liquid laundry detergent composition. In some examples the liquid laundry detergent composition comprises less than 15%, or less than 12% by weight of the liquid laundry detergent composition of water. In some examples, the laundry detergent composition is a liquid laundry detergent composition comprising a non-aqueous solvent selected from 1,2-propanediol, dipropylene glycol, tripropyleneglycol, glycerol, sorbitol, polyethylene glycol or a mixture thereof. In some examples, the liquid laundry detergent composition comprises between 10% and 40%, or between 15% and 30% by weight of the liquid laundry detergent composition of the non-aqueous solvent. In some examples, the laundry detergent composition comprises a perfume. In some examples, the laundry detergent composition comprises an adjunct ingredient which can be selected from the group comprising builders including citrate, (encapsulated) enzymes including but not limited to proteases, amylases, lipases, cellulases, mannanases, xyloglucanases, DNA'ses, and mixtures thereof, bleach, bleach catalyst, aesthetic dye, hueing dye, brightener, cleaning polymers including alkoxylated polyamines and polyethyleneimines, soil release polymers, fabric conditioning polymers including Polyquaternium 10 (CathEC), further surfactant including amine oxide and solvent, chelants including aminocarboxylate and aminophosphonate chelants, dye transfer inhibitors, encapsulated perfume, polycarboxylates, structurant, pH trimming agents, antioxidants, preservatives, antibacterial agents including Tinosan HP100, probiotics, and mixtures thereof. In some examples, the laundry detergent composition has a pH between 6 and 10, between 6.5 and 8.9, or between 7 and 8, wherein the pH of the laundry detergent composition is measured as a 10% product concentration in demineralized water at 20° C. When liquid, the laundry detergent composition may be Newtonian or non-Newtonian. In some examples, the liquid laundry detergent composition is non-Newtonian. Without wishing to be bound by theory, a non-Newtonian liquid has properties that differ from those of a Newtonian liquid, more specifically, the viscosity of non-Newtonian liquids is dependent on shear rate, while a Newtonian liquid has a constant viscosity independent of the applied shear rate. The decreased viscosity upon shear application for non-Newtonian liquids is thought to further facilitate liquid detergent dissolution. The liquid laundry detergent composition described herein can have any suitable viscosity depending on factors such as formulated ingredients and purpose of the composition.

EXAMPLES

Water-soluble detergent pouches were made on a conveyor belt according to the invention through deforming a first water-soluble film into a cavity, dosing powder detergent into the cavity, and cleaning the seal area through a scraper positioned at a scraper height of 0.1 mm and 0.5 mm respectively, and a following vacuum nozzle positioned at a height of 14 mm, followed by closing and sealing the cavity with a second film. While the scraper positioned at a height of 0.5 mm did not yield any visible damage within the seal area, holes were visually observed within the seal for the scraper set at a height of 0.1 mm only.

In absence of the scraper within the same test design powder leakers through the seal area were clearly observed, contrary to the scraper comprising test designs. A lower vacuum nozzle height (11 mm), still in the absence of a scraper, was able to address the powder leakers however yielded a higher pouch weight variation (see table 1).

TABLE 1

| Vacuum nozzle height [mm] | Pouch weight standard deviation [g] | Pouch weight mean [g] |
|---|---|---|
| 11 | 0.38 | 18.9 |
| 14 | 0.24 | 18.8 |

As used in this specification and the appended claims, the singular forms "a", "an", and "the" include plural references unless the content clearly dictates otherwise. Thus, for example, "a volatile material" may include more than one volatile material.

The dimensions and values disclosed herein are not to be understood as being strictly limited to the exact numerical values recited. Instead, unless otherwise specified, each such dimension is intended to mean both the recited value and a functionally equivalent range surrounding that value. For example, a dimension disclosed as "40 mm" is intended to mean "about 40 mm".

Every document cited herein, including any cross referenced or related patent or application, is hereby incorporated herein by reference in its entirety unless expressly excluded or otherwise limited. The citation of any document is not an admission that it is prior art with respect to any invention disclosed or claimed herein or that it alone, or in any combination with any other reference or references, teaches, suggests or discloses any such invention. Further, to the extent that any meaning or definition of a term in this document conflicts with any meaning or definition of the same term in a document incorporated by reference, the meaning or definition assigned to that term in this document shall govern.

While particular embodiments of the present invention have been illustrated and described, it would be obvious to those skilled in the art that various other changes and modifications can be made without departing from the spirit and scope of the invention. It is therefore intended to cover in the appended claims all such changes and modifications that are within the scope of this invention.

What is claimed is:

1. A process for making a water-soluble detergent pouch, the process comprising the steps of:

(a) placing a first water-soluble film over a mold having a cavity and a surrounding edge;

(b) deforming the first water-soluble film into the cavity and over the surrounding edge to form an open recess and a film-covered surrounding edge;

(c) filling the open recess with a solid component of a detergent composition to form a filled recess, wherein some of the solid component also spills onto the film-covered surrounding edge;

(d) passing a scraper over a top of the filled recess and a top of the film-covered surrounding edge to remove some of the solid component from the film-covered surrounding edge to form a scraped film-covered surrounding edge, wherein the first water-soluble film is free from contact with any scraper during the process;

(e) applying a vacuum to the scraped film-covered surrounding edge to remove some of the solid component from the scraped film-covered surrounding edge to form a vacuumed film-covered surrounding edge; and (f) positioning a second water-soluble film over the filled recess and vacuumed film-covered surround edge, and closing the filled recess by sealing the second water-soluble film to the first water-soluble film present in the vacuumed film-covered surrounding edge, to form the water-soluble detergent pouch, wherein the water-soluble detergent pouch comprises the detergent composition having the solid component that is enclosed by the first water-soluble film and the second water-soluble film.

2. The process according to claim 1, wherein during step (d) a distance between the scraper and the water-soluble film is from about 0.2 mm to about 1.0 mm.

3. The process according to claim 1, wherein during step (d) an angle of the scraper to the plane of the top of the film-covered surrounding edge is from about 80° to about 100°.

4. The process according to claim 1, wherein during step (d) an angle of the scraper to a machine direction is from above 0° to about 90°.

5. The process according to claim 1, wherein the scraper used in step (d) is a rigid blade having a chamfered tip.

6. The process according to claim 1, wherein during step (e), the vacuum is applied using a nozzle and wherein an average air velocity at the nozzle tip is from about 5.0 m/s to about 9.0 m/s.

7. The process according to claim 1, wherein during step (e) the vacuum is applied using a nozzle having a cross section of from about 0.03 $m^2$ to about 0.04 $m^2$, and wherein an air flow through the nozzle is from about 750 $m^3$/hr to about 900 $m^3$/hr.

8. The process according to claim 1, wherein the water-soluble film is a polyvinyl alcohol film.

9. The process according to claim 1, wherein the water-soluble detergent pouch is a water-soluble laundry detergent pouch, and wherein the detergent composition is a laundry detergent composition.

10. The process according to claim 1, wherein the water-soluble detergent pouch is a water-soluble automatic dishwashing detergent pouch, and wherein the detergent composition is an automatic dishwashing detergent composition.

11. The process according to claim 1, wherein the second water-soluble film comprises one or more pre-formed compartments.

12. The process according to claim 11, wherein the one or more pre-formed compartments contain a liquid component of the detergent composition.

13. The process according to claim 1, wherein the process is a continuous process, wherein the molds are placed on a moving conveyor that passes underneath the scraper during step (d), and underneath the vacuum during step (e).

14. The process according to claim 1, wherein one scraper is positioned across multiple rows.

15. The process according to claim 1, wherein one vacuum is positioned across multiple rows.

* * * * *